United States Patent
Kodali et al.

(10) Patent No.: US 9,294,974 B2
(45) Date of Patent: Mar. 22, 2016

(54) MOTION BASED SEARCH AND MEASUREMENT PERIODICITY

(71) Applicant: Apple Inc., Cupertino, CA (US)

(72) Inventors: Sree Ram Kodali, Sunnyvale, CA (US); Jianxiong Shi, Dublin, CA (US); Jinghua Ling, Palo Alto, CA (US); Longda Xing, San Jose, CA (US); Madhusudan Chaudhary, Campbell, CA (US); Navid Damji, Cupertino, CA (US); Sai Sravan Bharadwaj Karri, Santa Clara, CA (US); Shivesh Makharia, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/291,777

(22) Filed: May 30, 2014

(65) Prior Publication Data

US 2015/0350976 A1 Dec. 3, 2015

(51) Int. Cl.
  *H04W 36/00* (2009.01)
  *H04W 48/16* (2009.01)
  *H04W 76/04* (2009.01)

(52) U.S. Cl.
  CPC ...... *H04W 36/0088* (2013.01); *H04W 36/0016* (2013.01); *H04W 48/16* (2013.01); *H04W 76/048* (2013.01)

(58) Field of Classification Search
  CPC .................. H04W 36/0088; H04W 36/0016; H04W 48/16; H04W 76/048
  USPC .......................................................... 455/440
  See application file for complete search history.

(56) References Cited

U.S. PATENT DOCUMENTS

| | | | |
|---|---|---|---|
| 6,526,286 B2 | 2/2003 | Wan | |
| 7,123,917 B2 * | 10/2006 | Kalhan et al. | 455/437 |
| 8,190,153 B2 | 5/2012 | Zhao | |
| 8,554,163 B2 | 10/2013 | Deshpande et al. | |
| 2008/0132225 A1 * | 6/2008 | Ranta et al. | 455/424 |
| 2014/0335863 A1 * | 11/2014 | Wu et al. | 455/436 |
| 2015/0045020 A1 * | 2/2015 | Wang et al. | 455/434 |

FOREIGN PATENT DOCUMENTS

EP 1146756 10/2000

* cited by examiner

*Primary Examiner* — Michael Neff
(74) *Attorney, Agent, or Firm* — Meyertons Hood Kivlin Kowert & Goetzel, P.C.; Jeffrey C. Hood

(57) ABSTRACT

Adjusting search and measurement periodicity based on device motion. A wireless device may camp on a serving cell. Signal strength, signal quality, and signal to noise ratio of the serving cell may be measured. If each is above a respective threshold, and if the wireless device is stationary, the periodicities at which searches and neighbor cell measurements are performed may be adjusted (e.g., increased) from baseline periodicities.

20 Claims, 7 Drawing Sheets

| DRX Cycle Length (s) | Search Periodicity in Seconds (Number of DRX Cycles) | Measurement Periodicity in Seconds (Number of DRX Cycles) |
|---|---|---|
| 0.32 | 11.52 (36) | 1.28 (4) |
| 0.64 | 17.92 (28) | 1.28 (2) |
| 1.28 | 32 (25) | 1.28 (1) |
| 2.56 | 58.88 (23) | 2.56 (1) |

FIG. 6

| DRX Cycle Length (s) | Search Periodicity in Seconds for Low/Equal Priority Layer (Number of DRX Cycles) | Search Periodicity in Seconds for High Priority Layer | Measurement Periodicity in Seconds (Number of DRX Cycles) |
|---|---|---|---|
| 0.32 | 11.52 (36)* $K_{carrier}$ | (60* $N_{layers}$) | 1.28 (4)* $K_{carrier}$ |
| 0.64 | 17.92 (28)* $K_{carrier}$ | (60* $N_{layers}$) | 1.28 (2)* $K_{carrier}$ |
| 1.28 | 32 (25)* $K_{carrier}$ | (60* $N_{layers}$) | 1.28 (1)* $K_{carrier}$ |
| 2.56 | 58.88 (23)* $K_{carrier}$ | (60* $N_{layers}$) | 2.56 (1)* $K_{carrier}$ |

FIG. 7

| DRX Cycle Length (s) | Search Periodicity in Seconds for Low/Equal Priority Layer | Search Periodicity in Seconds for High Priority Layer | Measurement Periodicity in Seconds (Number of DRX Cycles) |
|---|---|---|---|
| 0.32 | 30* $K_{carrier}$ | (60* $N_{layers}$) | 5.12 (16)* $K_{carrier}$ |
| 0.64 | 30* $K_{carrier}$ | (60* $N_{layers}$) | 5.12 (8)* $K_{carrier}$ |
| 1.28 | 30* $K_{carrier}$ | (60* $N_{layers}$) | 6.4 (5)* $K_{carrier}$ |
| 2.56 | 60* $K_{carrier}$ | (60* $N_{layers}$) | 7.68 (3)* $K_{carrier}$ |

FIG. 8

| DRX Cycle Length (s) | Search Periodicity in Seconds for Low/Equal Priority Layer | Search Periodicity in Seconds for High Priority Layer | Measurement Periodicity in Seconds (Number of DRX Cycles) |
|---|---|---|---|
| 0.32 | 30* $K_{carrier}$ | (60* $N_{layers}$) | 5.12 (16)* $K_{carrier}$ |
| 0.64 | 30* $K_{carrier}$ | (60* $N_{layers}$) | 5.12 (8)* $K_{carrier}$ |
| 1.28 | 30* $K_{carrier}$ | (60* $N_{layers}$) | 6.4 (5)* $K_{carrier}$ |
| 2.56 | 60* $K_{carrier}$ | (60* $N_{layers}$) | 7.68 (3)* $K_{carrier}$ |

FIG. 9

| DRX Cycle Length (s) | Measurement Periodicity in Seconds (Number of DRX Cycles) |
|---|---|
| 0.32 | 5.12 (16) |
| 0.64 | 5.12 (8) |
| 1.28 | 6.4 (5) |
| 2.56 | 7.68 (3) |

FIG. 10

| DRX Cycle Length (s) | Search Periodicity in Seconds for Low/Equal Priority Layer | Search Periodicity in Seconds for High Priority Layer | Measurement Periodicity in Seconds (Number of DRX Cycles) |
|---|---|---|---|
| 0.32 | | (60* $N_{layers}$) | 5.12 (16)* Kcarrier |
| 0.64 | | (60* $N_{layers}$) | 5.12 (8)* Kcarrier |
| 1.28 | | (60* $N_{layers}$) | 6.4 (5)* Kcarrier |
| 2.56 | | (60* $N_{layers}$) | 7.68 (3)* Kcarrier |

FIG. 11

| DRX Cycle Length (s) | Search Periodicity in Seconds for Low/Equal Priority Layer | Search Periodicity in Seconds for High Priority Layer | Measurement Periodicity in Seconds (Number of DRX Cycles) |
|---|---|---|---|
| 0.32 | | (60* $N_{layers}$) | 5.12 (16)* Kcarrier |
| 0.64 | | (60* $N_{layers}$) | 5.12 (8)* Kcarrier |
| 1.28 | | (60* $N_{layers}$) | 6.4 (5)* Kcarrier |
| 2.56 | | (60* $N_{layers}$) | 7.68 (3)* Kcarrier |

FIG. 12

MOTION BASED SEARCH AND MEASUREMENT PERIODICITY

FIELD

The present application relates to wireless devices, and more particularly to a system and method for a wireless device to modify frequency search and cell measurement periodicities based on device motion.

DESCRIPTION OF THE RELATED ART

Wireless communication systems are rapidly growing in usage. Further, wireless communication technology has evolved from voice-only communications to also include the transmission of data, such as Internet and multimedia content. Some examples of wireless communication standards include GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Many wireless communication technologies, such as cellular communication technologies, provide mobile communication capabilities to wireless devices, such as cellular phones. For example, cellular communication services may be provided by deploying a network of cells on various radio frequencies and at various locations, such that a wireless device may select and attach to a serving cell, with the capability to re-select to a new serving cell. In many instances, wireless devices may periodically perform searches for cells within their communication range, and perform certain measurements on those cells, as part of the cell selection/re-selection process.

SUMMARY

Embodiments are presented herein of methods for wireless devices to adjust search and measurement periodicities based on device motion, and of devices configured to implement the methods.

According to the techniques described herein, a wireless device which is stationary and whose serving cell is providing good service (e.g., as defined according to a desired set of parameters or conditions) may increase the periodicity (reduce the frequency) with which searches for and measurements of neighboring cells are performed from a baseline periodicity.

As one possibility, a serving cell which provides good service may be one whose signal strength, signal quality, and/or signal to noise ratio exceed a respective threshold for each metric.

If the wireless device ceases to be stationary, the serving cell degrades, a neighbor cell becomes better than (or close to) the serving cell, or an unusually large number of failures to decode paging messages are occurring, the searches for and measurements of neighboring cells may again be performed at the baseline frequency.

The techniques described herein may be implemented in and/or used with a number of different types of devices, including but not limited to cellular phones, tablet computers, wearable computing devices, portable media players, cellular network infrastructure equipment, servers, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which:

FIGS. 6-12 are tables illustrating exemplary 3GPP specification defined search and measurement periodicities for various intra-frequency, inter-frequency, and inter-RAT scenarios.

Figure 1:
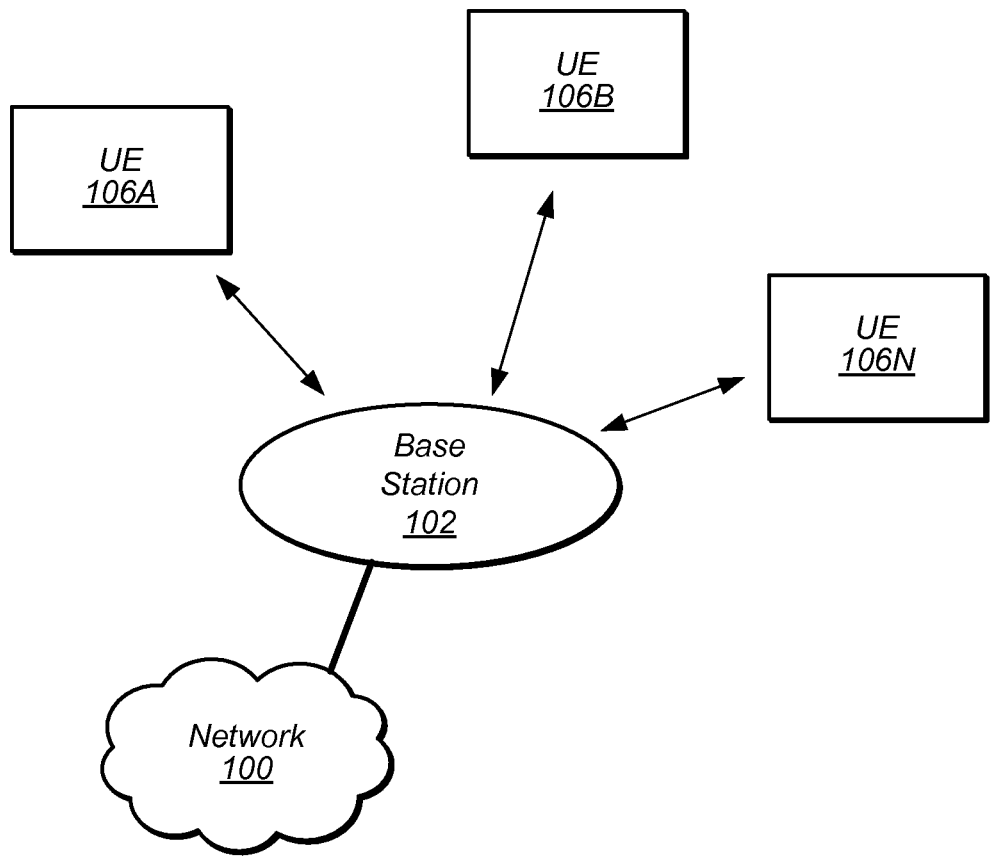
FIG. 1 illustrates an exemplary (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present Patent Application:
UE: User Equipment
BS: Base Station
GSM: Global System for Mobile Communication
UMTS: Universal Mobile Telecommunication System
LTE: Long Term Evolution

Terms

The following is a glossary of terms used in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
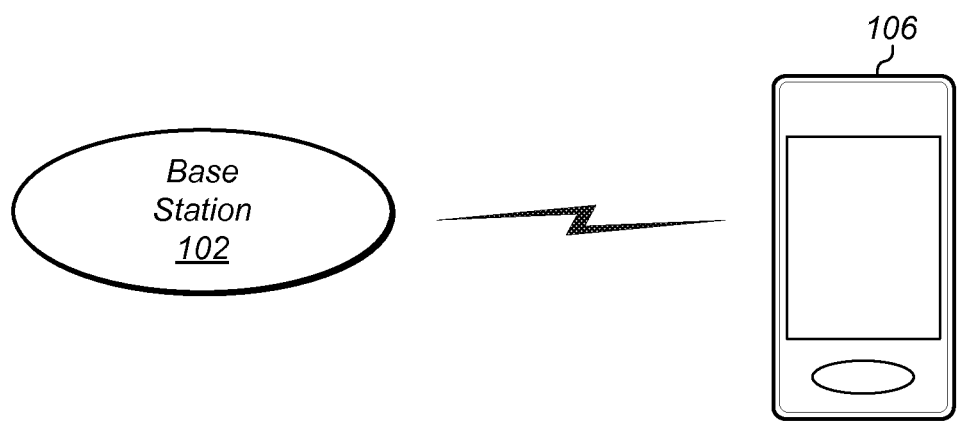
FIG. 2 illustrates an exemplary base station (BS) in communication with an exemplary wireless user equipment (UE) device.

FIGS. 1 and 2—Communication System

FIG. 1 illustrates an exemplary (and simplified) wireless communication system. It is noted that the system of FIG. 1 is merely one example of a possible system, and embodiments of the disclosure may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. If the base station 102 is implemented in the context of LTE, it may alternately be referred to as an 'eNodeB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The communication area (or coverage area) of the base station may be referred to as a "cell." The base station 102 and the UEs 106 may be configured to communicate over the transmission medium using any of various radio access technologies (RATs), wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

A UE 106 may on various occasions perform searches in order to discover neighbor cells, and perform measurements on some or all known neighbor cells, for example to support mobile operation of the UE 106. While any of various search techniques may be used, as one example, a frequency channel (or "layer") to be searched may first be scanned for signal strength, power spectrum density profile (PSD), bandwidth, and/or other characteristics. If the characteristics are determined to indicate that cellular communication may be present on that layer, an attempt may be made to acquire/identify the system deployed at that frequency (e.g., by decoding broadcast information such as a system information block (SIB)). Other techniques (which may depend on the RAT according to which the search is being performed, the type of search being performed, whether or not the UE 106 is already attached to a serving cell, etc.) are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple RATs. For example, the UE 106 may be configured to communicate using two or more of GSM, UMTS, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
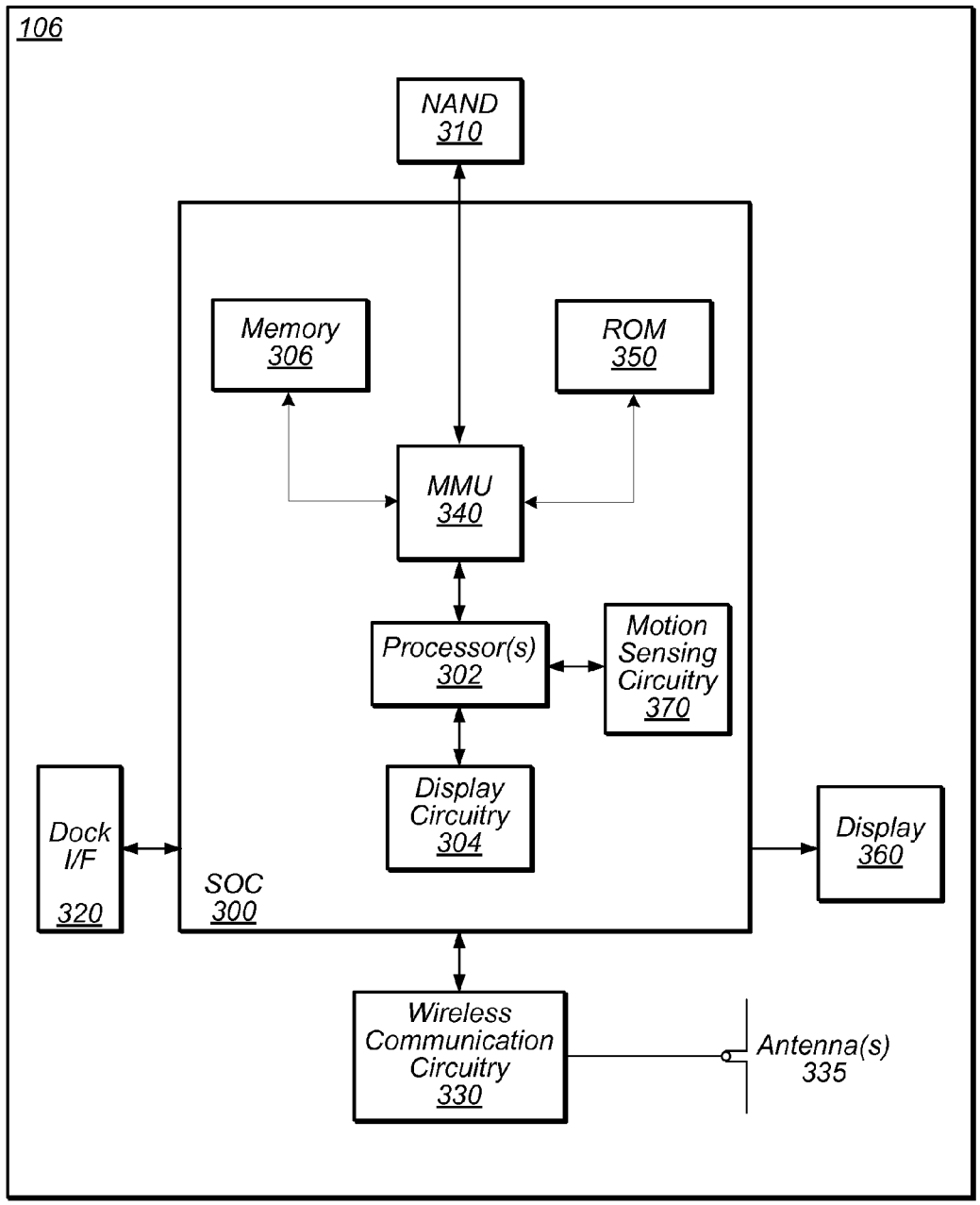
FIG. 3 illustrates an exemplary block diagram of a UE.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE 106 may be configured to communicate wirelessly using multiple wireless communication standards in some embodiments.

As described further subsequently herein, the UE 106 may include hardware and software components for implementing features for adjusting search and/or measurement periodicities based on device motion, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
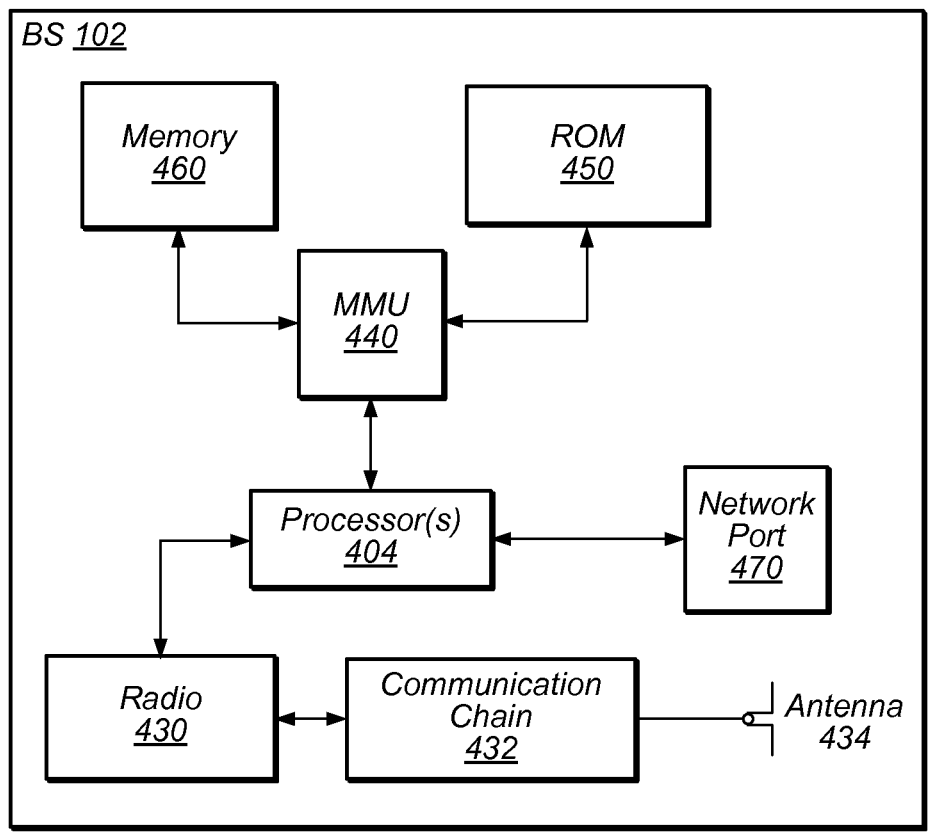
FIG. 4 illustrates an exemplary block diagram of a BS.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

FIG. 5—Flowchart

Figure 5:
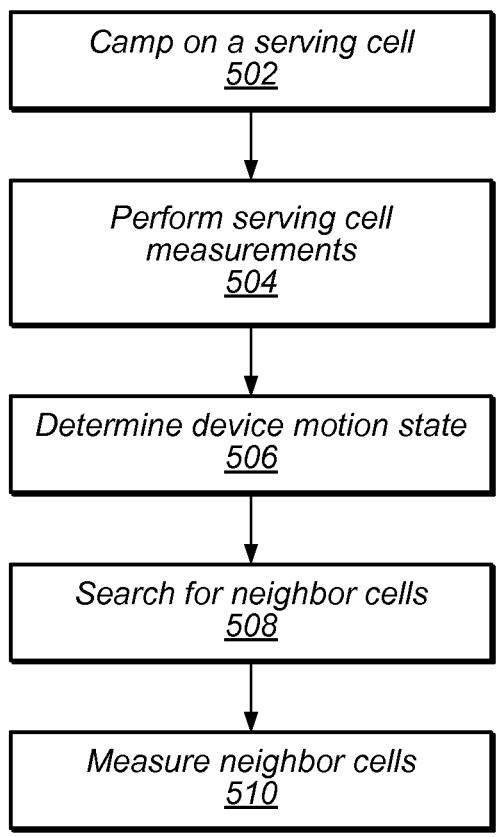
FIG. 5 is a flowchart diagram illustrating an exemplary method for a UE to modify search and measurement periodicities based on device motion.

FIG. 5 is a flowchart diagram illustrating a method for a UE device 106 to modify search and measurement periodicities based on device motion. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, the UE may camp on a first cell. The UE may utilize any of various wireless communication technologies to camp on the serving cell. For example, the serving cell may operate according to any of GSM, UMTS, LTE, CDMA2000 (1×RTT, HRPD), etc. The cell may accordingly be provided by a base station 102 and may provide a connection to a core network, e.g., of a cellular service provider. The base station 102 may operate in conjunction with numerous other base stations (which may provide other cells) and other network hardware and software to provide continuous (or nearly continuous) overlapping wireless service over a wide geographic area.

The first cell may serve the UE 106 and provide a connection to the core network via the first wireless link, and as such may act as the "serving" cell for the UE 106. There may also be one or more "neighboring" cells, provided by nearby base stations, with which the UE 106 may be capable of discovering, detecting signals from, and possibly communicating, but with which the UE 106 may not have an active wireless link.

The UE 106 may camp on the first cell in an idle mode. The idle mode may be used when the UE 106 is not actively exchanging data (e.g., as part of a call or a networking application such as a web browser) with the network, and may alternatively be referred to as a radio resource control idle mode or RRC idle mode (e.g., in contrast to an RRC connected mode or state). As part of the idle mode, the UE 106 may utilize a "discontinuous reception" or "DRX" technique. In DRX, a UE 106 may generally be inactive (e.g., with one or more components, such as radio and/or baseband components, powered down or sleeping) except for a (often relatively short) temporal window of activity during each DRX cycle. The active portion of a DRX cycle may be scheduled in a regular periodic manner; for example, many networks schedule the active portion of DRX cycles to occur at 1.28 s intervals, or at some multiple of 1.28 s (e.g., 2.56 s, 5.12 s, etc). Other values for DRX periodicity (e.g., 0.32 s, 9.64 s, etc.) may be used as desired.

During the active portion of a DRX cycle, the UE 106 may perform certain actions according to the configuration of the UE 106 and/or according to the configuration information received from the network. For example, the UE 106 may monitor a paging channel for incoming voice calls or data during the active portion of the DRX cycle. Information indicating the length and/or other characteristics of the DRX cycle may be provided by the network to the UE 106 as part of configuration information, in order to facilitate coordinated operation between the UE 106 and the network. Cell searches and measurements may also be performed in the active portion of at least some DRX cycles.

In 504, the UE may perform measurements on the first cell. The serving cell measurements on the first cell may be performed during the active portion of a DRX cycle.

The measurements may include any or all of signal strength, signal quality, and/or signal to noise ratio (SNR) of the first cell, among various possible measurements. The metrics used for each type of measurement may depend on the wireless communication technology according to which the first cell operates. For example, RSRP might be measured as a signal strength metric of an LTE cell, while RSCP might be measured as a signal strength metric of a UMTS cell. As another example, RSRQ might be measured as a signal quality metric of an LTE cell, while Ec/No might be measured as a signal quality metric of a UMTS cell. Other metrics may also be used, e.g., depending on the wireless communication technology.

In 506, a motion state of the UE 106 may be determined. The state of motion of the UE 106 may be either 'stationary' or 'non-stationary', as two possibilities. For example, if motion above a motion threshold is detected, the UE 106 may be determined to be non-stationary, while if motion detected is below the motion threshold, the UE 106 may be determined to be non-stationary. Other states of motion may be defined if desired.

The motion detection may be performed by motion sensing circuitry of the UE 106. For example, the UE 106 may include one or more accelerometers, gyroscopes, vibration sensors, and/or other motion sensing components, which may be capable of sensing motion magnitude and type for various types of motion.

In 508, the UE 106 may search for one or more neighbor cells. The UE 106 may search any of various frequencies or "layers" for neighbor cells. The layers searched may include 'intra-frequency' layers (i.e., layers in the same frequency band as the layer on which the serving cell of the UE 106 is deployed), 'inter-frequency' layers (i.e., layers in a different frequency band than the serving cell, on which cells are deployed which operate according to the same RAT as the serving cell of the UE 106), and/or inter-RAT layers (i.e., layers on which cells are deployed which operate according to a different RAT than the serving cell of the UE 106). Which layers are searched by the UE 106 may depend on capabilities and configuration of the UE 106. For example, the layers which the UE 106 is capable of searching may depend on which wireless communication technologies the UE 106 is capable of utilizing, and on which layers those wireless communication technologies may be deployed. Which layers are searched by the UE 106 may also or alternatively depend on configuration information received from the network to which the UE 106 is attached. For example, the serving cell of the UE 106 may be aware of specific layers on which neighbor cells are deployed, and so may explicitly indicate to the UE 106 to search those layers for neighbor cells.

The UE 106 may search for neighbor cells during the active portion of a DRX cycle. However, it may be the case that not every layer which the UE 106 is configured to search is searched by the UE 106 during every DRX cycle. It may be common for cellular communication standards bodies (e.g., 3GPP, 3GPP2) to specify search periodicities at which to search for each of intra-frequency layers, inter-frequency layers, and inter-RAT layers according to various cellular communication standards. At least in some instances, the specified search periodicities for each type of layer may further depend on other factors, such as DRX cycle length, whether a layer is 'high priority' or 'low priority', how many layers are configured at a particular time, and/or which RAT a layer belongs to (e.g., in the case of inter-RAT layers), among various possibilities, if desired. As further described subsequently herein, FIGS. 6-12 illustrate exemplary tables specifying search (and measurement) periodicities for various intra-frequency, inter-frequency, and inter-RAT scenarios according to 3GPP specification documents, such as 3GPP TS 36.133 and 36.304. Such periodicities may be used as baseline search periodicities according to which the UE 106 may search for neighbor cells, if desired; however, other specified periodicities may also or alternatively be used as desired (e.g., if using other wireless communication technologies, if 3GPP standards change, if a proprietary implementation is desired, etc.).

As previously noted, the UE 106 may perform such searches for neighbor cells at least in part as a mobility supporting feature. For example, if the service provided by the serving cell of the UE 106 degrades, for example because the UE 106 is moving out of the service area of that cell, the UE 106 may use its knowledge of the existence of neighbor cells as part of an algorithm to re-select to a new serving cell.

However, if the UE 106 is in a stationary state and the serving cell of the UE 106 is providing acceptable service to the UE 106, the marginal utility of frequently searching for neighbor cells may decrease, since the likelihood of either service quality provided by the current serving cell degrading or changes in which neighbor cells are available may be lower than while mobile. Thus, at least in some instances, the periodicity (or periodicities) at which the UE 106 searches layers for neighbor cells may be modified based at least in part on the determined motion state of the UE 106.

More particularly, the periodicity at which the UE 106 searches layers for neighbor cells may be increased (i.e., a longer period may be used) if the UE 106 is stationary and has been so for at least a certain minimum amount of time, and if some or all of various conditions indicating that the serving cell is providing acceptable service are true. For example, the search periodicity specified for a given layer (e.g., based on intra-frequency, inter-frequency, or RAT (i.e., if inter-RAT), priority, DRX cycle length, number of layers to be searched, etc.) may be multiplied by a ("first") configured factor. The first factor may be any number, such as 2, 3, 4, 5, etc., as desired, e.g., depending on the desired degree by which search periodicity is to be increased in stationary conditions.

One set of possibilities for evaluating the serving cell may include determining whether or not the signal strength of the serving cell is greater than a signal strength threshold, whether or not the signal quality of the serving cell is greater than a signal quality threshold, and/or whether or not the SNR of the serving cell is greater than a SNR threshold. For example, if all three area greater than their respective thresholds, this may be an indication of a good serving cell, and thus may be used as a basis in combination with determining that the UE 106 is stationary to increase the periodicity with which the UE 106 searches for neighbor cells, if desired.

As a further (or alternate) possibility for evaluating the serving cell, it may be determined whether or not a certain ("failure threshold") number of failures have occurred (e.g., within a certain period of time, and/or in proportion to a total number of attempts to decode paging messages) when attempting to decode paging messages. For example, if fewer than the failure threshold number of failures have occurred, this may be an indication of a good serving cell, and thus may be used as a basis in combination with determining that the UE 106 is stationary to increase the periodicity with which the UE 106 searches for neighbor cells, if desired.

Note that in some instances, even if a serving cell is providing good service and a UE 106 is stationary, it may be preferable to search for neighbor cells at normal or baseline periodicities. For example, if there are one or more neighbor cells which have relatively high signal strength/signal quality/SNR, (e.g., better than or possibly within a threshold difference (e.g., 2 dB, 3 dB, 4 dB, etc.) of the serving cell, and/or above a 're-selection' threshold), it may be preferable to monitor those cells relatively frequently, for example by searching layers on which they are deployed at least at their normal/baseline specified periodicities.

If conditions change such that the serving cell is no longer considered to provide acceptable service (e.g., if any or all of signal strength/signal quality/SNR fall below their respective threshold, and/or if the failure threshold number of paging failures have occurred), the UE 106 may decrease the periodicity (or periodicities) at which the UE 106 searches layers for neighbor cells, for example back to the specified 'baseline' periodicities. Likewise, if at some point the UE 106 is no longer stationary, the UE 106 may decrease its search periodicities. Similarly, if any neighbor cells passes a re-selection threshold (e.g., with respect to signal strength, signal quality, and/or SNR) and/or comes within a signal strength, signal quality, and/or SNR threshold of the serving cell, the UE 106 may decrease its search periodicities.

The UE 106 may further transition between the use of 'stationary' and 'non-stationary' search periodicities, e.g., depending on the conditions experienced by the UE 106, any number of further times. However, at least in some instances, a guard interval timer may be used to prevent transitioning back and forth with excessive frequency, if desired. For example, after resuming motion and 'baseline' search periodicities, a UE 106 may be configured to wait at least until expiration of the guard interval timer to again increase search periodicities by the first factor, even if all other configured conditions to do so are true. The guard interval may have any of various values, such as 10 s, 30 s, 60 s, 120 s, etc., as desired.

In 510, the UE 106 may perform measurements on one or more neighbor cells. The UE 106 may perform cell measurements any of various frequencies or layers on which neighbor cells are deployed. Similar to the layers searched by the UE 106, the layers on which measurements are performed may include intra-frequency layers, inter-frequency layers, and/or inter-RAT layers. Which layers are measured by the UE 106 may depend on capabilities and configuration of the UE 106, much as which layers are searched by the UE 106 may depend on capabilities and configuration of the UE 106; in addition, which layers are measured may depend on recent search results. For example, the layers on which the UE 106 performs measurements may include any layers on which neighbor cells were discovered when searching those layers.

The UE 106 may perform measurements on neighbor cells during the active portion of a DRX cycle. As with neighbor cell searches, it may be the case that the UE 106 does not perform measurements on every layer which it is configured to measure during every DRX cycle. The specified measurement periodicities for each type of layer may depend on whether a layer is an intra-frequency, inter-frequency, or inter-RAT, DRX cycle length, whether a layer is 'high priority' or 'low priority', how many layers are configured at a particular time, and/or which RAT a layer belongs to (e.g., in the case of inter-RAT layers), among various possibilities. As further described subsequently herein, FIGS. 6-12 illustrate exemplary tables specifying measurement (and search) periodicities for various intra-frequency, inter-frequency, and inter-RAT scenarios according to 3GPP specification documents, such as 3GPP TS 36.133 and 36.304. Such periodicities may be used as baseline measurement periodicities according to which the UE 106 may perform measurements on neighbor cells, if desired; however, other specified periodicities may also or alternatively be used as desired (e.g., if using other wireless communication technologies, if 3GPP standards change, if a proprietary implementation is desired, etc.).

Similar to searching for neighbor cells, performing measurements on neighbor cells may also be a mobility supporting feature. Also similarly, if the UE 106 is in a stationary state and the serving cell of the UE 106 is providing acceptable service to the UE 106, the marginal utility of frequently measuring neighbor cells may decrease, since the likelihood of substantial changes in serving cell and neighbor cells signal strength, signal quality, and/or SNR may be lower than while mobile. Thus, at least in some instances, the periodicity (or periodicities) at which the UE 106 performs measurements on neighbor cell layers may be modified based at least in part on the determined motion state of the UE 106.

More particularly, the periodicity at which the UE 106 performs measurements (e.g., signal strength, signal quality, SNR, etc.) on neighbor cell layers may be increased (i.e., a longer period may be used) if the UE 106 is stationary and has been so for at least a certain minimum amount of time, and if some or all of various conditions indicating that the serving cell is providing acceptable service are true. For example, the measurement periodicity specified for a given layer (e.g., based on intra-frequency, inter-frequency, or RAT (i.e., if inter-RAT), priority, DRX cycle length, number of layers to be searched, etc.) may be multiplied by a ("second") configured factor. The second factor may be any number, such as 3, 5, 6, 8, 10, etc., as desired, e.g., depending on the desired degree by which measurement periodicity is to be increased in stationary conditions. Note that the second factor (the factor by which measurement periodicities may be modified in stationary conditions) may be different than the first factor (the factor by which search periodicities may be modified in stationary conditions), or the same, as desired.

The conditions used as indicators or evaluators of a serving cell's acceptability in conjunction with determining whether to modify measurement periodicity when the UE 106 is stationary may be similar to those used to determine whether or not to modify search periodicity when the UE 106 is stationary, if desired. For example, signal strength, signal quality, and/or SNR of the serving cell may be compared with respective signal strength, signal quality, and/or SNR thresholds, and/or paging message decoding failures and successes may be monitored, and if it is determined on these bases that the serving cell is providing acceptable service and the UE 106 is in a stationary state, the periodicities with which the UE 106 measures neighbor cells may be modified by the second factor.

Additionally, there may be some instances in which it may be preferable to perform measurements on neighbor cells at normal or baseline periodicities even if a serving cell is providing good service and a UE 106 is stationary. For example, if there are one or more neighbor cells which have relatively high signal strength/signal quality/SNR, (e.g., better than or possibly within a threshold difference of the serving cell, and/or above a 're-selection' threshold), it may be preferable to monitor those cells relatively frequently, for example by performing measurements on layers on which they are deployed at least at their normal/baseline specified periodicities.

If conditions change such that the serving cell is no longer considered to provide acceptable service (e.g., if any or all of signal strength/signal quality/SNR fall below their respective threshold, and/or if the failure threshold number of paging failures have occurred), the UE 106 may decrease the periodicities at which the UE 106 measures neighbor cell layers, for example back to the specified 'baseline' periodicities. Likewise, if at some point the UE 106 is no longer stationary, the UE 106 may decrease its measurement periodicities. Similarly, if any neighbor cells passes a re-selection threshold (e.g., with respect to signal strength, signal quality, and/or SNR) and/or comes within a signal strength, signal quality, and/or SNR threshold of the serving cell, the UE 106 may decrease its measurement periodicities.

The UE 106 may further transition between the use of 'stationary' and 'non-stationary' measurement periodicities, e.g., depending on the conditions experienced by the UE 106, any number of further times. However, as with transitioning between the use of 'stationary' and 'non-stationary' search periodicities, a guard interval timer may be used to prevent transitioning back and forth with excessive frequency, if desired. The guard interval may have any of various values, and the same or a different guard interval may be used with respect to search periodicity transitions and measurement periodicity transitions, as desired.

Thus, if desired, both neighbor cell search and measurement periodicities may be modified (albeit potentially by different factors) based on similar or even the same set of conditions. Modifying (i.e., increasing and decreasing) search and measurement periodicities in this manner may allow a UE 106 to realize power consumption reductions without compromising service quality by performing neighbor cell searches and measurements less frequently in circumstances in which more frequent neighbor cell searches and measurements may provide little or no additional benefit.

Note that the features for modifying search periodicities based on device motion state and modifying measurement periodicities based on device motion state described herein may be applied independently or together, as desired. Additionally, it may be the case that either or both of these features may be used in conjunction with any or all of various RATs, including but not limited to GSM, UMTS (WCDMA, TDS-CDMA), CDMA2000 (1×RTT, 1×EV-DO, HRPD, eHRPD), LTE, etc.

Note further that these features may be internally configured (e.g., as part of device design/operating algorithm(s)) or configured by the network to which the UE 106 is attached. Furthermore, any of the various thresholds and parameters (e.g., the factors by which search and measurement periodicities, respectively, may be modified under stationary and otherwise appropriate conditions) described herein may likewise be either internally configured or provided by the network (e.g., as configuration parameter values), among various possibilities. If configured or provided by the network, any of various means of configuring such features and/or parameters may be used; for example, such information may be provided in one or more information elements in one or more RRC configuration messages, broadcast in one or more system information blocks (SIBs), and/or provided in any of various other ways, as desired.

FIGS. 6-12—Exemplary Search and Measurement Periodicity Tables

FIGS. 6-12 are tables illustrating exemplary 3GPP specification defined search and measurement periodicities for various intra-frequency, inter-frequency, and inter-RAT scenarios for a wireless device operating according to LTE, such as might be found in 3GPP TS 36.133 and/or 36.304. It should be noted that the exemplary details illustrated in and described with respect to FIGS. 6-12 are not intended to be limiting to the disclosure as a whole: numerous variations and alternatives to the details provided herein below are possible and should be considered within the scope of the disclosure.

The table illustrated in FIG. 6 shows exemplary specified search and measurement periodicities (in seconds and number of DRX cycles) for intra-frequency layers.

The table illustrated in FIG. 7 shows exemplary specified search and measurement periodicities for low/equal priority and high priority inter-frequency layers.

The table illustrated in FIG. 8 shows exemplary specified search and measurement periodicities for low/equal priority and high priority UMTS-FDD inter-RAT layers.

The table illustrated in FIG. 9 shows exemplary specified search and measurement periodicities for low/equal priority and high priority UMTS-TDD inter-RAT layers.

The table illustrated in FIG. 10 shows exemplary specified search and measurement periodicities for GSM inter-RAT layers.

The table illustrated in FIG. 11 shows exemplary specified search and measurement periodicities for high priority HRPD inter-RAT layers.

The table illustrated in FIG. 12 shows exemplary specified search and measurement periodicities for high priority 1×RTT inter-RAT layers.

As shown, the specified periodicities may further depend on DRX cycle length. In those tables in which it is used, the parameter 'Kcarrier' may refer to the number of E-UTRA inter-frequency carriers indicated by the serving cell. Note that the term 'Kcarrier' may be set to "1" if a measured cell belongs to high priority layer and it meet re-selection threshold (e.g., the cell is found in a high priority search). The parameter '$N_{layers}$', may be the total number of configured higher priority E-UTRA, UTRA FDD, UTRA TDD, CDMA2000 1× and HRPD carrier frequencies and may additionally be increased by one if one or more groups of GSM frequencies is configured as a higher priority. Additionally, note that (when applicable) the search periodicity defined in "Search Periodicity in Seconds For Low/Equal Priority Layer" may be used if $Srxlev \leq S_{nonIntraSearchP}$ or $Squal \leq S_{nonIntraSearchQ}$, e.g., irrespective of high priority layers.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a wireless user equipment (UE) device, the method comprising:
camping on a first cell in idle mode;
measuring a signal strength metric, a signal quality metric, and a signal to noise ratio (SNR) of the first cell;
determining that signal strength of the first cell is above a signal strength threshold, signal quality of the first cell is above a signal quality threshold, and SNR of the first cell is above a SNR threshold;
determining that the UE device has been stationary for at least a first amount of time;
increasing neighbor cell search periodicities in accordance with a first predefined factor based on determining that signal strength of the first cell is above the signal strength threshold, signal quality of the first cell is above the signal quality threshold, SNR of the first cell is above the SNR threshold, and the UE device has been stationary for at least the first amount of time; and
increasing neighbor cell measurement periodicities in accordance with a second predefined factor based on determining that signal strength of the first cell is above the signal strength threshold, signal quality of the first cell is above the signal quality threshold, SNR of the first cell is above the SNR threshold, and the UE device has been stationary for at least the first amount of time.

2. The method of claim 1, wherein increasing neighbor cell search periodicities in accordance with the first predefined factor comprises:
multiplying specified search periodicities for each of intra-frequency, inter-frequency, and inter-radio access technology (RAT) searches by the first predefined factor to generate a respective modified search periodicity for each of intra-frequency, inter-frequency, and inter-RAT frequency searches; and
performing searches according to the respective modified search periodicity for each of intra-frequency, inter-frequency, and inter-RAT searches.

3. The method of claim 1, wherein increasing neighbor cell measurement periodicities in accordance with the second predefined factor comprises:
multiplying specified cell measurement periodicities for each of intra-frequency, inter-frequency, and inter-radio access technology (RAT) neighbor cells by the second predefined factor to generate a respective modified measurement periodicity for each of intra-frequency, inter-frequency, and inter-RAT neighbor cells; and
performing cell measurements according to the respective modified measurement periodicity on each of intra-frequency, inter-frequency, and inter-radio access technology (RAT) neighbor cells.

4. The method of claim 1, wherein determining that the UE device has been stationary for at least the first amount of time is performed by a motion sensor of the UE device.

5. The method of claim 1, the method further comprising:
determining that the UE device is no longer stationary;
reducing neighbor cell search periodicities in accordance with the first predefined factor based on determining that the UE device is no longer stationary; and
reducing neighbor cell measurement periodicities in accordance with the second predefined factor based on determining that the UE device is no longer stationary.

6. The method of claim 1, the method further comprising:
determining that one or more of signal strength of the first cell is no longer above the signal strength threshold, signal quality of the first cell is no longer above the signal quality threshold, or SNR of the first cell is no longer above the SNR threshold;
reducing neighbor cell search periodicities in accordance with the first predefined factor based on determining that one or more of signal strength of the first cell is no longer above the signal strength threshold, signal quality of the first cell is no longer above the signal quality threshold, or SNR of the first cell is no longer above the SNR threshold; and
reducing neighbor cell measurement periodicities in accordance with the second predefined factor based on determining that one or more of signal strength of the first cell is no longer above the signal strength threshold, signal quality of the first cell is no longer above the signal quality threshold, or SNR of the first cell is no longer above the SNR threshold.

7. The method of claim 1, the method further comprising:
determining that one or more neighbor cells has signal strength above a re-selection threshold;
reducing neighbor cell search periodicities in accordance with the first predefined factor based on determining that one or more neighbor cells has signal strength above a re-selection threshold; and
reducing neighbor cell measurement periodicities in accordance with the second predefined factor based on determining that one or more neighbor cells has signal strength above a re-selection threshold.

8. The method of claim 1, the method further comprising:
determining that a threshold number of paging decode failures have occurred;
reducing neighbor cell search periodicities in accordance with the first predefined factor based on determining that a threshold number of paging decode failures have occurred; and
reducing neighbor cell measurement periodicities in accordance with the second predefined factor based on determining that a threshold number of paging decode failures have occurred.

9. A wireless user equipment (UE) device, the UE device comprising:
a radio;
motion sensing circuitry; and
a processing element operably coupled to the radio;
wherein the radio, motion processing circuitry, and the processing element are configured to:
camp on a serving cell;
periodically perform serving cell measurements according to a first periodicity;
determine whether or not the UE device is stationary;
periodically perform neighbor frequency measurements and searches according to specified periodicities for each of intra-frequency, inter-frequency, and inter-radio access technology (RAT) measurements and searches; and
increase periodicity of neighbor frequency measurements by a first factor and increase periodicity of neighbor frequency searches by a second factor relative to the specified periodicities for each of intra-frequency, inter-frequency, and inter-radio access technology (RAT) measurements and searches if the UE device is stationary and if serving cell signal strength, signal quality, and signal to noise ratio (SNR) are each above a respective threshold.

10. The UE device of claim 9, wherein the radio, motion processing circuitry, and the processing element are further configured to, after increasing periodicity of neighbor frequency measurements by the first factor and increasing periodicity of neighbor frequency searches by the second factor:
decrease periodicity of neighbor frequency measurements and searches to the specified periodicities for each of intra-frequency, inter-frequency, and inter-RAT measurements and searches if the UE device is no longer stationary.

11. The UE device of claim 9, wherein the radio, motion processing circuitry, and the processing element are further configured to, after increasing periodicity of neighbor frequency measurements by the first factor and increasing periodicity of neighbor frequency searches by the second factor:
decrease periodicity of neighbor frequency measurements and searches to the specified periodicities for each of intra-frequency, inter-frequency, and inter-RAT measurements and searches if any of serving cell signal strength, signal quality, or SNR is no longer above its respective threshold.

12. The UE device of claim 9, wherein the radio, motion processing circuitry, and the processing element are further configured to, after increasing periodicity of neighbor frequency measurements by the first factor and increasing periodicity of neighbor frequency searches by the second factor:
decrease periodicity of neighbor frequency measurements and searches to the specified periodicities for each of intra-frequency, inter-frequency, and inter-RAT measurements and searches if one or more neighbor cells measured characteristics are within a configured delta threshold of one or more corresponding measured characteristics of the serving cell.

13. The UE device of claim 9, wherein the radio, motion processing circuitry, and the processing element are further configured to, after increasing periodicity of neighbor frequency measurements by the first factor and increasing periodicity of neighbor frequency searches by the second factor:
decrease periodicity of neighbor frequency measurements and searches to the specified periodicities for each of intra-frequency, inter-frequency, and inter-RAT measurements and searches if one or more neighbor cells measured characteristics are above a cell re-selection threshold.

14. The UE device of claim 9,
wherein the first periodicity at which serving cell measurements are performed is not modified based on whether or not the UE device is stationary.

15. A non-transitory computer accessible memory medium comprising program instructions which, when executed at a wireless user equipment (UE) device, cause the UE device to:
camp on a serving cell in idle mode using discontinuous reception (DRX);
periodically perform serving cell measurements;
periodically perform neighbor cell searches;
periodically perform neighbor cell measurements; and
determine a current motion state of the UE device,
wherein a periodicity according to which neighbor cell searches are performed and a periodicity according to which neighbor cell measurements are performed depend at least in part on the current motion state of the UE device.

16. The memory medium of claim 15,
wherein neighbor cell searches and measurements are performed according to a first set of periodicities if serving cell measured signal strength, signal quality, and signal to noise ratio values are each above a respective threshold and if the current motion state of the UE device is stationary,
wherein neighbor cell searches and measurements are performed according to a second set of periodicities if any of serving cell measured signal strength, signal quality, or signal to noise ratio values are below their respective threshold or if the current motion state of the UE device is non-stationary.

17. The memory medium of claim 16,
wherein a guard interval timer is used to prevent performing neighbor cell searches and measurements according to the first set of periodicities again for a guard interval amount of time after transitioning from performing neighbor cell searches and measurements according to the first set of periodicities to performing neighbor cell searches and measurements according to the second set of periodicities.

18. The memory medium of claim 16,
wherein neighbor cell searches and measurements are also performed according to the second set of periodicities if signal strength of one or more neighbor cells is above a re-selection threshold or within a delta threshold of signal strength of the serving cell.

19. The memory medium of claim 15, wherein when executed, the program instructions further cause the UE device to:
determine an amount of time for which the UE device has been in the current motion state of the UE device;
wherein the periodicity according to which neighbor cell searches are performed and the periodicity according to which neighbor cell measurements are performed further depend at least in part on the amount of time for which the UE device has been in the current motion state of the UE device.

20. The memory medium of claim 15,
wherein serving cell measurement periodicity does not depend on the motion state of the UE device.

* * * * *